(12) United States Patent
Glitho et al.

(10) Patent No.: US 6,226,643 B1
(45) Date of Patent: May 1, 2001

(54) SUBSCRIBER CREATION AND DELETION INTERFACE BETWEEN A CUSTOMER ADMINISTRATIVE SYSTEM AND DATABASE NETWORK ELEMENTS OF A COMMUNICATIONS NETWORK

(75) Inventors: Roch Glitho; Christophe Gourraud, both of Montreal (CA)

(73) Assignee: Telefonaktiebolaget LM Ericsson (publ) (SE)

( * ) Notice: Subject to any disclaimer, the term of this patent is extended or adjusted under 35 U.S.C. 154(b) by 0 days.

(21) Appl. No.: 09/119,132

(22) Filed: Jul. 20, 1998

(51) Int. Cl.$^7$ ...................................................... G06F 17/30
(52) U.S. Cl. ................................ 707/10; 707/9; 707/102; 379/230
(58) Field of Search ............................. 707/10, 1, 9, 505, 707/2, 200, 102, 104, 201, 202; 395/200, 610; 709/226, 223, 201, 203, 238, 225; 364/419.03; 379/230; 455/433, 432; 370/385, 249

(56) References Cited

U.S. PATENT DOCUMENTS

| | | | |
|---|---|---|---|
| 5,535,120 | * 7/1996 | Chong et al. | 364/419.03 |
| 5,537,467 | 7/1996 | Cheng et al. | 379/211 |
| 5,572,579 | * 11/1996 | Orriss et al. | 379/142 |
| 5,581,601 | 12/1996 | Abramowski et al. . | |
| 5,608,720 | * 3/1997 | Biegel et al. | 370/249 |
| 5,650,994 | 7/1997 | Daley . | |
| 5,682,460 | * 10/1997 | Hyziak et al. | 395/600 |
| 5,694,546 | * 12/1997 | Reisman | 395/200.9 |
| 5,696,906 | 12/1997 | Peters et al. . | |
| 5,729,688 | 3/1998 | Kim et al. . | |
| 5,732,127 | * 3/1998 | Hayes | 379/115 |
| 5,758,281 | * 5/1998 | Emery et al. | 455/428 |
| 5,761,500 | * 6/1998 | Gallant et al. | 395/610 |
| 5,771,275 | * 6/1998 | Brunner et al. | 370/385 |
| 5,802,510 | * 9/1998 | Jones | 707/2 |
| 5,835,724 | * 11/1998 | Smith | 395/200.57 |
| 5,884,322 | * 3/1999 | Sidhu et al. | 707/200 |
| 5,901,352 | * 5/1999 | St-Pierre et al. | 455/426 |

FOREIGN PATENT DOCUMENTS

WO 99/27733   6/1999   (WO) .

OTHER PUBLICATIONS

PCT International Search Report, Jun. 29, 1999, PCT/SE 99/01174.

M. Tschichholz, et al., "Integrated Approach to Open Distributed Management", Computer Communications, vol. 19, No. 1, Jan. 1996, pp. 76–87.

* cited by examiner

*Primary Examiner*—Kim Vu
*Assistant Examiner*—Anh Ly
(74) *Attorney, Agent, or Firm*—Jenkens & Gilchrist

(57) ABSTRACT

A customer administrative system is interfaced with one or more database network elements having unique subscriber creation or deletion policies. An agent is included within the interface to process a received generic subscriber creation or deletion command originated by a customer administrative system. Responsive thereto, the one or ones of the database network elements implicated by the command are identified and issued, in accordance with the appropriate unique policy for each identified database network element, the required individual database network element specific commands necessary to effectuate the subscriber creation or deletion activity.

13 Claims, 4 Drawing Sheets

SUBSCRIBER CREATION AND DELETION INTERFACE BETWEEN A CUSTOMER ADMINISTRATIVE SYSTEM AND DATABASE NETWORK ELEMENTS OF A COMMUNICATIONS NETWORK

BACKGROUND OF THE INVENTION

1. Technical Field of the Invention

The present invention relates to a communications network and, in particular, to an enhancement of the interface between a customer administrative system and database network elements of a communications network to support a generic subscriber creation and deletion policy.

2. Description of Related Art

Reference is now made to FIG. 1 wherein there is shown a block diagram illustrating a portion of a communications network 10 implementing a prior art transaction-based interface (IF) 12 between a customer administrative system (CAS) 14 and a plurality of database network elements (NE) 16. The interface 12, customer administrative system 14, and database network elements 16 are interconnected using a network 18 preferably comprising a network, such as an X.25 network, separate and apart from the communications network 10. As an example, the communications network 10 may comprise a wireless (for example, cellular) telecommunications system, with each database network element 16 then comprising, for example, a database storing permanent and temporary wireless subscriber data (e.g., a home location register (HLR)). The permanent data stored in the database network element 16 comprises fixed information concerning the communications service subscripted to by each subscriber. The temporary data stored in the database network element 16 comprises variable information concerning the current location of each subscriber.

The customer administrative system 14 is utilized to engage in transactions relating to the administration of the permanent data stored in each database network element 16. These administration activities, in general, relate to transactions performed for the purposes of customer (i.e., subscriber) creation or deletion, service activation, and the like, relating to a given customer. More particularly, the transactions relate to subscriber data administration tasks such as:

subscription initiation/removal/status, subscriber activation/cancellation, service provision/withdrawal/activation/passivation, C-number (transfer) definition, pass code changes, and serial number changes.

The transactions may further relate to authentication administration tasks such as authentication activation/change/deactivation/status. Additionally, the transactions relate to numbering plan configuration including number range assignment, numbering plan deletion and numbering plan viewing.

By ▒transaction-based▒ is meant that the interface 12 receives orders originated at the customer administrative system 14 and directed (i.e., addressed) to a particular one of the database network elements 16, converts those commands to a proper format for communication to and/understanding by the addressed database network element, and routes to the addressed database network element. Similarly, the interface 12 receives any response to the order from the addressed database network element 16, converts the response to a proper format for communication to and/understanding by the customer administrative system 14 that originated the order, and routes to the originating customer administrative system.

It is recognized that each of the database network elements 16 may have a unique policy with respect to the procedures and transactions to be implemented in connection with the creation or deletion of subscribers, and further that the policies relating to identical creation or deletion activities may differ from element to element. Take, for example, the subscriber deletion activity. One database network element 16 may implement a policy for subscriber deletion wherein the following transactions must be performed (in this order): (1) delete each of the services allocated to the subscriber, and then (2) explicitly delete the subscriber of those services. Another database network element 16 may implement a policy for subscriber deletion wherein the following transaction must be performed: delete each of the services allocated to the subscriber, with deletion of the subscriber of those services occurring automatically following deletion of all services. Yet another database network element 16 may implement a policy for subscriber deletion wherein the following transaction must be performed: explicitly delete the subscriber, with deletion of each of the services allocated to the subscriber occurring automatically following subscriber deletion.

Similar database network element 16 based differences and/or variations in policies with respect to the necessary transactions apply to subscriber creation. For example, one database network element 16 may implement a policy allowing a subscriber to be created without having to simultaneously assign that subscriber any services. In such a situation, the subscriber's services may be defined at a later stage. Yet another database network element 16 may require at least one service to be assigned at the time the subscriber is created.

In order to engage in a subscriber creation or deletion activity, the service provider must first recognize the appropriate policy or policies to be used for the implicated database network element(s) 16, and then second engage in the proper transactions in accordance with the policy to complete the subscriber creation or deletion activity on those database network elements. Take, for example, a subscriber deletion activity in accordance with the policy mentioned above wherein the following transactions must be performed (in this order): (1) delete each of the services allocated to the subscriber, and then (2) explicitly delete the subscriber of those services. In this scenario, first a command (comprising, for example, a service deletion request) is originated at the customer administrative system 14 for each one of the subscripted to services, with the commands directed through the interface 12 to the particular database network element(s) 16 supporting those services. The interface 12 functions in the manner described above to convert each of the commands to a proper format for communication to and/understanding by the implicated database network element 16, and routes the commands to that database network element. Next, a command (comprising, for example, a subscriber deletion request) is originated at the customer administrative system 14, and directed through the interface 12 to the particular database network element(s) 16 supporting the previously deleted services. The interface 12 functions in the manner described above to convert the command to a proper format for communication to and/understanding by the implicated database network element 16, and routes the command to that database network element.

The foregoing illustrates how labor (i.e., message) intensive the subscriber creation or deletion activity can be with respect to the customer administrative system for just a single unique policy on a single database network element. Additional complications to the subscriber creation or deletion activity are introduced when the subscriber and its services are being handled by plural database network elements. In such a situation, it is possible that the plural implicated database network elements each support different unique policies. Appropriate commands, in proper order and in accordance with each of the various unique policies, must be issued from the customer administrative system 14 and processed through the interface 12 for database network element 16 handling.

There is a need for an improved interface between a customer administrative system and a plurality of database network elements that will support a generic policy for subscriber creation or deletion.

SUMMARY OF THE INVENTION

An interface is provided between a customer administrative system and one or more database network elements having unique subscriber creation or deletion policies. The interface includes an agent supporting a generic subscriber creation or deletion policy. The agent functions responsive to a received generic subscriber creation or deletion command originated by a customer administrative system to identify the one or ones of the database network elements that are implicated by the command. The agent then generates, in accordance with the appropriate unique policy for each identified database network element, the required individual database network element specific commands necessary to effectuate the subscriber creation or deletion activity. The specific commands are then routed to the proper database network elements for processing to complete the generic command specified subscriber creation or deletion activity.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 2:
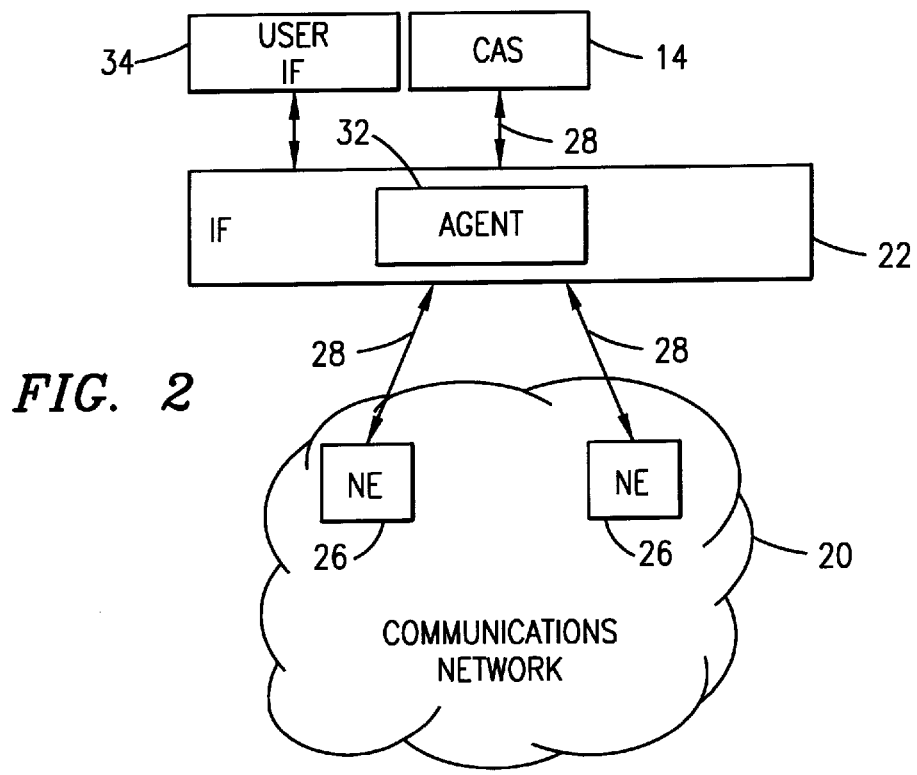
FIG. 2 is a block diagram of a portion of a communications network with a present invention interface between a customer administrative system and a plurality of database network elements wherein the interface supports a generic policy for subscriber creation and deletion activities.

Reference is now made to FIG. 2 wherein there is shown a block diagram of a portion of a communications network 20 implementing a present invention interface (IF) 22 between a customer administrative system (CAS) 24 and a plurality of database network elements (NE) 26 wherein the interface supports a generic policy for subscriber creation or deletion activities. In this regard, the database network elements 26 each implement a unique policy for subscriber creation or deletion activities. Examples of such policies have been previously described. In some situations, these unique policies may differ from element to element across the plurality of database network elements 26 within the same network 20. The interface 22, customer administrative system 24, and database network elements 26 are interconnected using a network 28 preferably comprising a network, such as an X.25 network, separate and apart from the communications network 20. As an example, the communications network 20 may comprise a wireless (for example, cellular) communications system, with each database network element 26 then comprising a database storing permanent and temporary wireless subscriber data (e.g., a home location register (HLR)) as previously described. Thus, the database network elements 26 store permanent data comprising subscriber communications service information, and temporary data comprising the current location of each subscriber. The communications network 20 may comprise an other service providing communications network such as, for example, an Internet type data communications network.

Figure 1:
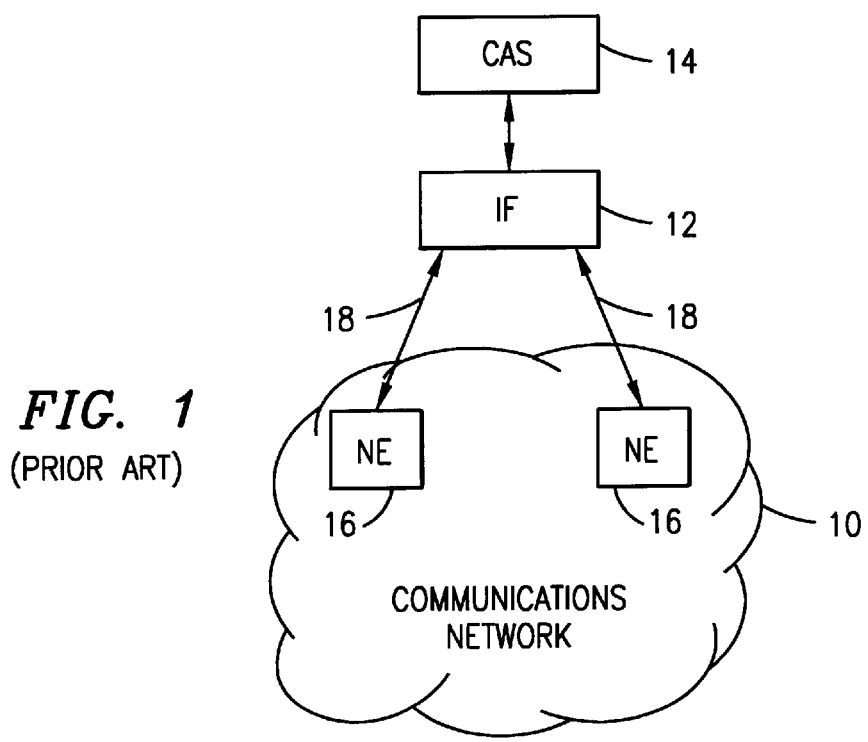
FIG. 1, previously described, is a block diagram of a portion of a communications network implementing a prior art transaction-based interface between a customer administrative system and a plurality of database network elements.

The interface 22 supports the same conventional transaction-based processing as the prior art interface 12 illustrated in FIG. 1 and previously described. These transactions involve customer administrative system 24 operation in administrating the permanent data stored in each database network element 26.

As an adjunct feature, the interface 22 further includes a generic subscriber creation and deletion agent 32. This agent 32 is charged with implementing subscriber creation and deletion activities in the database network elements 26 in response to a single generic subscriber creation or deletion command issued by the customer administrative system 24 and in accordance with the unique policies of each database network element. The agent 32 functions to (a) identify for each received generic subscriber creation or deletion command the one or more database network elements 26 that are affected by the command (i.e., the database network elements that support the subscription of a certain subscriber identified within the command), (b) identify the particular activation or management action(s) (arranged in proper order, if appropriate) to be taken by each identified database network element in connection with that generic command and in accordance with the unique subscriber creation or deletion policy for the identified database network element, (c) identify the individual element specific commands needed to accomplish the identified actions, (d) generate each of those individual element specific commands in a proper format (i.e., tailored), and in proper order, where appropriate, for communication to and/understanding by the identified database network elements, and (e) issue the individual element specific commands to each of those elements in accordance with its unique subscriber creation or deletion policy. To support this operation, the agent 32 keeps track of the unique subscriber creation or deletion policies for each database network element 26, as well as an identification of the subscription(s) owned by each subscriber along with the database network elements supporting those subscription(s). This policy and subscriber/ subscription related information may be input and changed when necessary by a user (not shown) to (and for storage in) the agent 32 through an appropriate user interface device 34 (such as a data terminal). The agent 32 accordingly recognizes for each identified subscriber, based on its subscription, which of the plural database network elements 26 need to be communicated with in order to effectuate a subscriber activation or deletion activity. For each received generic subscriber creation or deletion command, the appropriate ones of the plural database network elements 26 are identified and issued appropriately formatted individual element specific commands in accordance with the unique subscriber creation or deletion policy for each database network element. The agent 32 further receives any response to the individual element specific commands from the network elements 26, converts the responses (if necessary) to a single answer in a proper format for communication to and/understanding by the customer administrative system 24 that originated the generic command, and routes (if necessary) the properly formatted answer to that originating customer administrative system.

The generic subscriber creation or deletion command may further specify the scope of the subscriber creation or deletion activity to be performed. By this it is meant that a specification may be made for a limited subscriber creation or deletion activity instead of a global activity. Accordingly, the specified subscriber creation or deletion activity may be selectively chosen and implemented with respect to only a certain one or ones of the database network elements 26 within the network 20.

Figure 3:
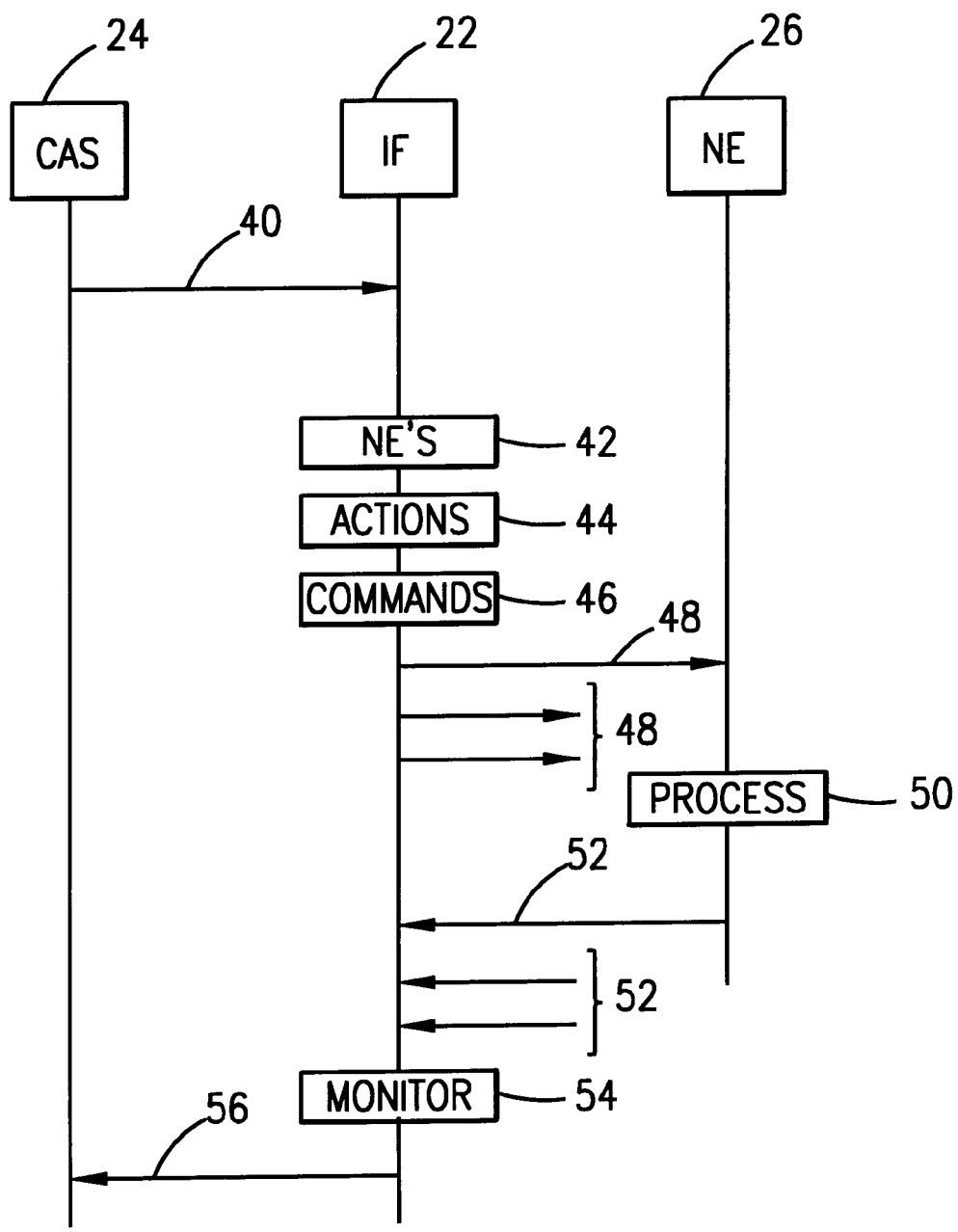
FIG. 3 is a nodal operation and signal flow diagram illustrating interface operation for handling customer administrative system generic commands for subscriber creation and deletion.

Reference is now additionally made to FIG. 3 wherein there is shown a nodal operation and signal flow diagram illustrating interface 22 agent 32 operation for handling customer administrative system 24 generic command specified subscriber creation or deletion activities. The customer administrative system 24 sends a machine independent (i.e., generic to machine) and policy generic subscriber creation or deletion command 40 (with a specified scope) to the interface 22. The adjunct agent 32 processes the received command in action 42 to determine which ones of the plurality of database network elements 26 need to be accessed in order to complete the requested subscriber creation or deletion activity. To support the identification process of action 42, the agent 32 keeps track of the relationships between each subscriber and its subscription(s) along with an identification of the database network element (s) 26 supporting those subscription(s). The agent 32 accordingly recognizes for each subscriber identified within the generic service creation or deletion command which of the plural database network elements 26 need to be communicated with in order to effectuate the designated activity. Following identification of these implicated database network elements 26, the interface 22 next identifies in action 44 the particular action(s) (arranged in proper order, if appropriate) to be taken by each database network element in connection with that generic command 40 and in accordance with the unique subscriber creation or deletion policy for the identified database network element. The interface 22 next identifies in action 46 the element specific commands which are needed to effectuate those actions by each of the database network elements 26. These element specific commands are ordered, where appropriate, in accordance with the pertinent unique subscriber creation or deletion policy, and are formatted in accordance with a certain format and protocol associated with each individual one of the identified database network elements 26 (such as a machine dependent language). As an example, the original machine independent generic command 40 is translated into a plurality of machine dependent commands 48 tailored to the identified database network elements and conforming to the unique subscriber creation or deletion policy for the identified database network element. The interface 22 then issues the properly formatted (and ordered) device specific commands 48 to each of the implicated database network elements 26. Once an issued, properly formatted command 48 has been received by an identified one of the database network elements 26, that element processes the command in action 50 to effectuate the required action concerning the specified subscriber creation or deletion activity. Once the action has been completed, the database network element 26 sends a confirmation message 52 back to the interface 22. In the meantime, the interface 22 monitors for receipt of the confirmation messages 52 in action 54 relating to each issued command 48 to determine whether all actions have been completed by the database network elements 26. If yes, the subscriber creation or deletion activity has been successfully completed. If not all confirmations are received within a certain time period, it is assumed that the required actions for service creation or deletion were not completed. Responsive to the monitoring determination in action 54, a return message 56 is sent by the interface 22 informing the originating customer administrative system 24 as to whether the generic command 40 concerning subscriber activation or deletion was successfully completed.

Figure 4:
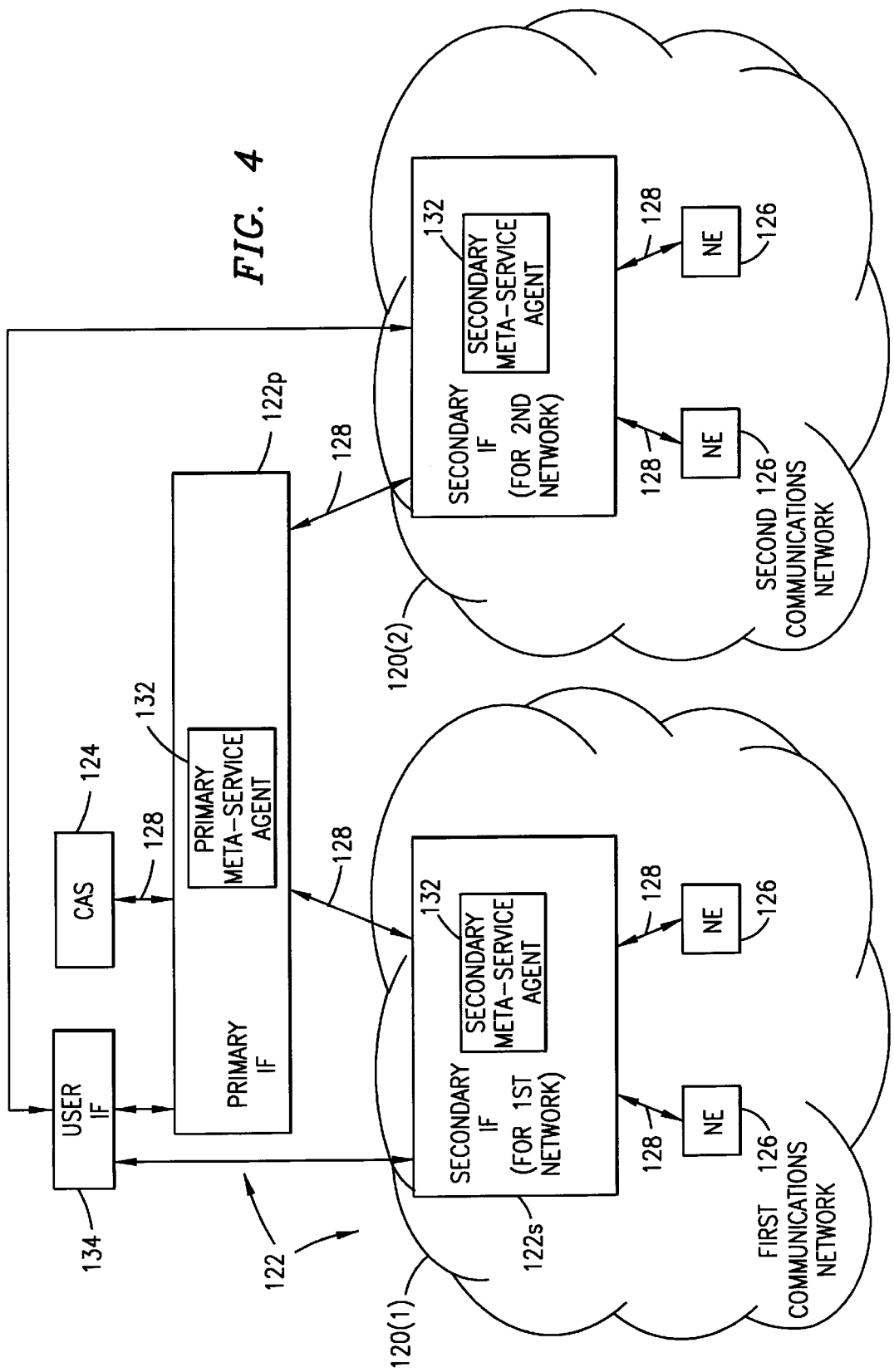
FIG. 4 is a block diagram of a plurality of communications networks with a present invention multi-layer interface between a customer administrative system and a plurality of database network elements wherein the multi-layer interface supports a generic policy for subscriber creation and deletion activities.

Reference is now made to FIG. 4 wherein there is shown a block diagram of a plurality of communications networks 120 with a present invention multi-layer interface (IF) 122 between a customer administrative system (CAS) 124 and a plurality of database network elements (NE) 126 located within the networks 120 wherein the multi-layer interface supports a generic policy for subscriber creation or deletion activities. In this regard, the database network elements 126 each implement a unique policy for subscriber creation or deletion activities. Examples of such policies have been previously described. In some situations, these unique policies may differ from element to element across the plurality of database network elements 126. The multi-layer interface 122, customer administrative system 124, and database network elements 126 (within the networks 120) are interconnected using a network 128 preferably comprising a network, such as an X.25 network, separate and apart from the communications networks 120. As an example, one of the communications networks 120(1) may comprise an Internet-type data communications network, and another one of the networks 120(2) may comprise a wireless (for example, cellular) communications system. With respect to the communications network 120(1), each of the database network elements 126 comprises a service node storing data communications service subscriber data. With respect to the communications network 120(2), each of the database network elements 126 comprises a database storing permanent and temporary wireless subscriber (e.g., a data home location register (HLR)). It is, of course, understood that in some instances the functionalities performed by the network elements 126 and the secondary interface 122s layer may be contained within a single node of the network 120.

The multi-layer interface 122 supports the same conventional transaction-based processing as the prior art interface 12 illustrated in FIG. 1 and previously described. These transactions involve customer administrative system 124 operation in administrating the data stored in each database network element 126.

As an adjunct feature, the multi-layer interface 122 further includes a generic subscriber creation and deletion agent 132. This agent 132 is charged with implementing subscriber creation and deletion activities across the networks 120 and in the database network elements 126 in response to a single generic subscriber creation or deletion command issued by the customer administrative system 124 and in accordance with the unique subscriber creation and deletion policies of the database network elements. The agent 132 functions to (a) identify for each received generic subscriber creation or deletion command the one or more database network elements 126 that are affected by the command (i.e., the database network elements that support the subscription (s) of a certain subscriber identified within the command), (b) identify the particular activation or management action (s) (arranged in proper order, if appropriate) to be taken by each identified database network element in connection with that generic command and in accordance with the unique subscriber creation or deletion policy for the identified database network element, (c) identify the individual element specific commands needed to accomplish the identified actions, (d) generate each of those individual element specific commands in a proper format (i.e., tailored), and proper order, where appropriate, for communication to and/ understanding by the identified database network elements, and (e) issue the individual element specific commands to each of those elements in accordance with its unique subscriber creation or deletion policy. To support this operation, the agent 132 keeps track of the unique subscriber creation or deletion policies for each database network element 126, as well as an identification of the subscription(s) owned by each subscriber along with the database network elements supporting those one or more subscriptions. This policy and subscriber/subscription related information may be input and changed when necessary by a user (not shown) to (and for storage in) the agent 132 through an appropriate user interface device 134 (such as a data terminal). The agent 132 accordingly recognizes for each subscriber, based on its subscription(s), which of the plural database network elements 126 need to be communicated with in order to effectuate a subscriber activation or deletion activity. For each generic subscriber creation or deletion command, the appropriate ones of the plural database network elements 126 are identified and issued appropriately formatted individual element specific commands in accordance with the unique subscriber creation or deletion policy for each database network element. The agent 132 further receives any response to the individual element specific commands from the network elements 126, converts the responses (if necessary) to a single answer in a proper format for communication to and/understanding by the customer administrative system 124 that originated the generic command, and routes (if necessary) the properly formatted answer to that originating customer administrative system.

With respect to this multi-layer interface 122 architecture, it is noted that a primary interface 122p layer is implemented to facilitate communications with the customer administrative system 124 concerning subscriber creation and deletion activities. It is further noted that a secondary interface 122s layer is implemented within each of the plural networks 120 to facilitate communications in each of the networks 120 with the proper database network elements 126. Each interface 122p or 122s layer includes agent 132 functionality for supporting a generic policy for subscriber creation or deletion activities. It is, of course, understood that the interface 122 in a plural network 120 system may alternatively be implemented as a single layer interface 22 in the manner illustrated in FIG. 2 and previously described. In the multi-layer structure illustrated, a user (not shown) may input appropriate policy and subscriber/subscription related information through the user interface 134 for storage in the agent 132 of each of the primary interface 122p layer and the secondary interface layer 122s.

The generic subscriber creation or deletion command may further specify the scope of the subscriber creation or deletion activity to be performed. By this it is meant that a specification may be made for a limited subscriber creation or deletion activity instead of a global activity. Accordingly, the specified subscriber creation or deletion activity may be selectively chosen and implemented with respect to only a certain one or ones of the database network elements 126 within the network 120. Still further, the specified subscriber creation or deletion activity may be selectively chosen and implemented with respect to certain database network elements 126 within only a certain one or ones of the networks 120.

Figure 5:
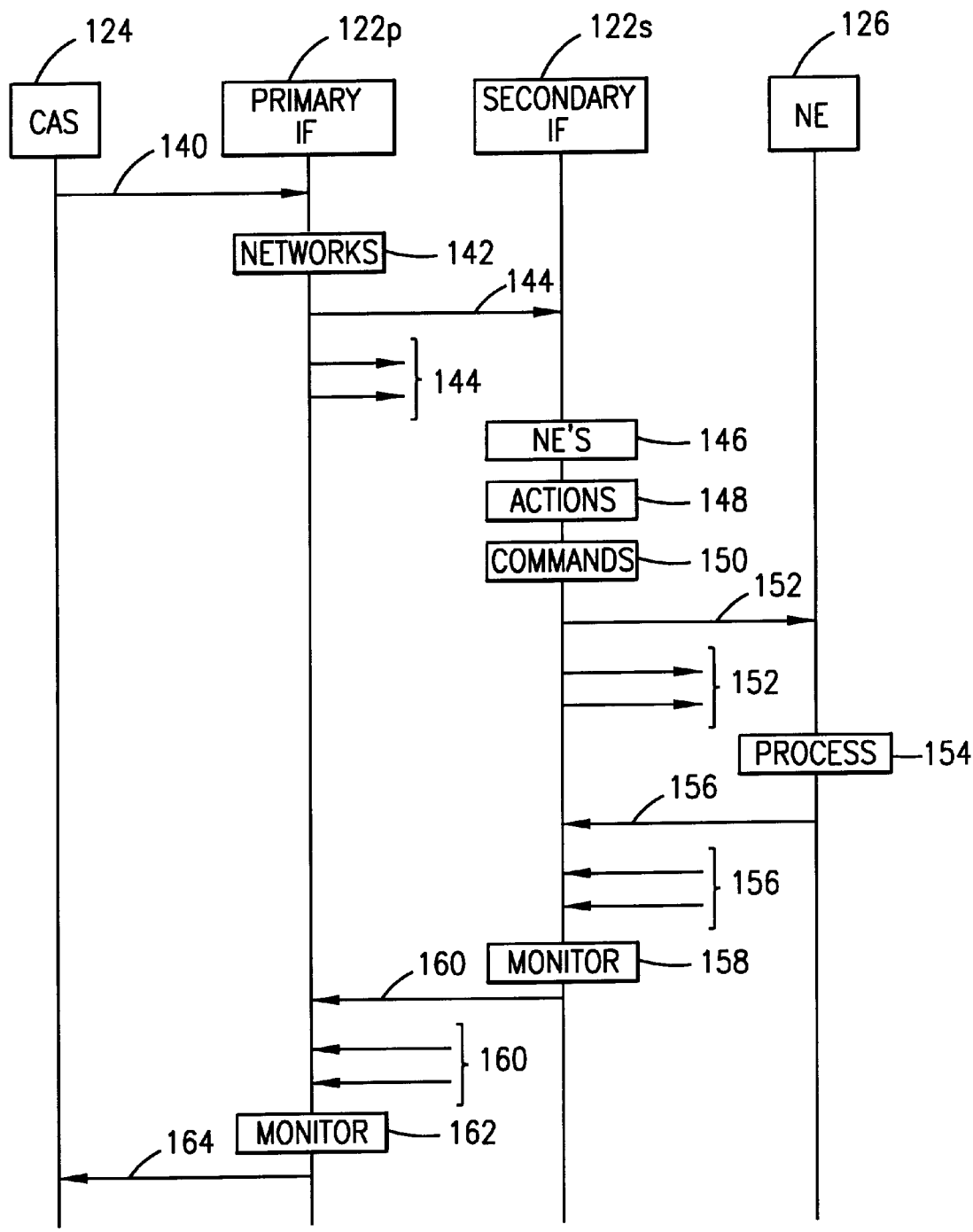
FIG. 5 is a nodal operation and signal flow diagram illustrating multi-layer interface operation for handling customer administrative system generic commands for subscriber creation and deletion.

Reference is now additionally made to FIG. 5 wherein there is shown a nodal operation and signal flow diagram illustrating multi-layer interface 122 agent 132 operation for handling customer administrative system 124 generic command subscriber creation or deletion activities. The customer administrative system 124 sends a machine independent (i.e., generic to machine) and policy generic subscriber creation or deletion command 140 (with a specified scope) to the primary interface 122p. The primary agent 132 within the primary interface layer 122p processes the received command in action 142 to identify which ones of the plural networks 120 need to be accessed in order to complete the requested subscriber creation or deletion activity. The received command is then forwarded (with any required minor modification) in command 144 on to the secondary interface 122s layer within each of those networks 120. The secondary agent 132 within each of the secondary interface 122s layers processes the forwarded command 144 in action 146 to identify which ones of the plurality of database network elements 126 need to be accessed in order to complete the requested subscriber creation or deletion activity. To support the identification process of action 146, the secondary agent 132 keeps track of the relationships between each subscriber and its subscription(s) along with the database network element(s) 126 supporting those subscription(s). The secondary agent 132 accordingly recognizes for each subscriber identified within the forwarded generic service creation or deletion command 144 which of the plural database network elements 126 need to be communicated with in order to effectuate the designated activity. Following identification of these implicated database network elements 126, the secondary interface 122s layer next identifies in action 148 the particular action(s) (arranged in proper order, if appropriate) to be taken by each database network element in connection with that forwarded generic command 144 and in accordance with the unique subscriber creation or deletion policy for the identified database network element. The secondary interface 122s layer next identifies in action 150 the element specific commands which are needed to effectuate those actions by each of the database network elements 126. These element specific commands are ordered, where appropriate, in accordance with the pertinent unique subscriber creation or deletion policy, and are formatted in accordance with a certain format and protocol associated with each individual one of the identified database network elements 126 (such as a machine dependent language). As an example, the original machine independent forwarded command 144 is translated into a plurality of machine dependent commands 152 tailored to the identified database network elements and conforming to the unique subscriber creation or deletion policy for the identified database network element. The secondary interface 122s layer then issues the properly formatted (and ordered) device specific commands 152 to each of the implicated database network elements 126. Once an issued, properly formatted command 152 has been received by an identified one of the database network elements 126, that element processes the command in action 154 to effectuate the required action concerning the specified subscriber creation or deletion activity. Once the action has been completed, the database network element 126 sends a confirmation message 156 back to the secondary interface 122s layer. In the meantime, the secondary interface 122s layer monitors for receipt of the confirmation messages 154 in action 158 relating to each issued command 152 to determine whether all actions have been completed by the database network elements 126. If yes, the subscriber creation or deletion activity in that network 120 has been successfully completed. If not all confirmations are received within a certain time period, it is assumed that the required actions for service creation or deletion were not completed. Responsive to the monitoring determination in action 158, a return message 160 is sent by the secondary interface 122s layer informing the primary interface 122p layer as to whether subscriber activation or deletion in that network 120 was successfully completed. In the meantime, the primary interface 122p layer monitors for receipt of the return messages 158 in action 162 relating to each forwarded command 144 to determine whether subscriber creation or deletion activities were successfully completed in each network 120. If yes, the generic message 140 specified subscriber creation or deletion activity has been successfully completed. If affirmative confirmations (messages 158) are not received from each secondary interface 122s layer within a certain time period, it is assumed that the required service creation or deletion activities were not completed. Responsive to the monitoring determination in action 162, a return message 164 is sent by the primary interface 122p layer to the originating customer administrative system 124 as to whether the generic command 140 concerning subscriber activation or deletion was successfully completed.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A system, comprising:
   a customer administrative system operating to issue a single generic command concerning a subscriber creation or deletion activity;
   a plurality of database network elements of a communications system, each database network element having a unique policy for subscriber creation or deletion; and
   an interface between the customer administrative system and each of the plurality of database network elements, the interface including an agent functionality responsive to the generic command for identifying the database network elements supporting a subscriber subscription implicated by the command, and issuing device specific commands to each of those identified database network elements in accordance with its unique policy for subscriber creation or deletion, wherein the issued device specific commands specify processing actions to be taken by the identified database network elements to effectuate the generic command specified subscriber creation or deletion activity.

2. The system as in claim 1 wherein the communications network comprises a wireless telecommunications network and the database network elements comprise home location registers of the wireless telecommunications network.

3. The system as in claim 2 wherein the communications network further comprises an Internet data communications network and the database network elements comprise Internet service nodes of the Internet data communications network.

4. An interface between a customer administrative system and a plurality of database network elements of a communications network, the interface including an agent functioning to:
   receive a single generic task command concerning a subscriber creation or deletion activity;
   identify certain ones of the plurality of database network elements which support a subscriber subscription implicated by the generic command;
   generate implementation commands to each of those identified certain ones of the database network elements in accordance with its unique policy for subscriber creation or deletion, wherein each of the generated implementation commands is specifically tailored to be understood by one of the identified certain ones of the database network elements; and
   issue the generated implementation commands to the identified certain ones of the database network elements, wherein the issued implementation commands specify processing actions to be taken by the identified certain ones of the database network elements to effectuate the generic command specified subscriber creation or deletion activity.

5. The interface as in claim 4 wherein the communications network comprises a wireless telecommunications network and the database network elements comprise home location registers of the wireless telecommunications network.

6. The interface as in claim 5 wherein the communications network further comprises an Internet data communications network and the database network elements comprise Internet service nodes of the Internet data communications network.

7. The interface as in claim 4 wherein the agent function to generate further functions to generate each implementation command in a machine dependent language for the identified certain ones of the database network elements.

8. The interface as in claim 4 wherein the agent function to generate further functions to translate the generic command from a machine independent language into a plurality of implementation commands each having a machine dependent language for the identified certain ones of the database network elements.

9. A method for interfacing a customer administrative system and a plurality of database network elements of a communications network, the method comprising the steps of:
   receiving a single generic command from the customer administrative system concerning a subscriber creation or deletion activity;
   identifying certain ones of the plurality of database network elements which support a subscriber subscription implicated by the generic command;
   generating implementation commands to each of those identified certain ones of the database network elements in accordance with its unique policy for subscriber creation or deletion, wherein each of the generated implementation commands is specifically tailored to be understood by one of the identified certain ones of the database network elements; and issuing the generated implementation commands to the identified certain ones of the database network elements, wherein the issued implementation commands specify processing actions to be taken by the identified certain ones of the database network elements to effectuate the generic command specified subscriber creation or deletion activity.

10. The method as in claim 9 wherein the communications network comprises a wireless telecommunications network and the database network elements comprise home location registers of the wireless telecommunications network.

11. The method as in claim 10 wherein the communications network further comprises an Internet data communications network and the database network elements comprise Internet service nodes of the Internet data communications network.

12. The method as in claim 9 wherein the step of generating further comprises the step of generating each implementation command in a machine dependent language for the identified certain ones of the database network elements.

13. The method as in claim 9 wherein the step of generating further comprises the step of translating the generic command from a machine independent language into a plurality of implementation commands each having a machine dependent language for the identified certain ones of the database network elements.

* * * * *